United States Patent [19]
Saberton et al.

[11] Patent Number: 5,161,424
[45] Date of Patent: Nov. 10, 1992

[54] ANTI-BACKLASH DRIVE SYSTEM

[75] Inventors: Mark Saberton, New Albany; Michael L. Trowbridge, Corydon, both of Ind.

[73] Assignee: Cargill Detroit Corporation, Clawson, Mich.

[21] Appl. No.: 758,566

[22] Filed: Sep. 12, 1991

[51] Int. Cl.$^5$ .................... F16H 55/18; F16H 29/20
[52] U.S. Cl. ........................ 74/409; 74/89.17; 74/89.22; 74/89.21; 74/422; 474/102
[58] Field of Search .............. 74/89.17, 89.21, 89.22, 74/409, 422; 474/102, 106

[56] References Cited

U.S. PATENT DOCUMENTS

| | | | |
|---|---|---|---|
| 1,545,309 | 7/1925 | Davis et al. | 474/106 |
| 2,196,231 | 4/1940 | Ridgway | 74/409 |
| 3,704,449 | 11/1972 | Hutchins | 74/409 X |
| 3,769,850 | 11/1973 | Culligan | 74/422 X |
| 3,850,043 | 11/1974 | Tarbox | 74/89.21 X |
| 4,305,307 | 12/1981 | Kiunke | 74/409 |
| 4,570,617 | 2/1986 | Baus | 74/422 X |
| 4,714,388 | 12/1987 | Siler | 74/409 X |
| 4,753,119 | 6/1988 | Kuspert | 74/89.22 X |
| 4,887,477 | 12/1989 | Hauser et al. | 74/89.17 |
| 4,938,087 | 7/1990 | Ragard | 74/89.21 |
| 5,085,619 | 2/1992 | Torii et al. | 74/409 X |

FOREIGN PATENT DOCUMENTS 62-72949  4/1987  Japan .................... 474/102

Primary Examiner—Leslie A. Braun
Assistant Examiner—Julie Krolikowski
Attorney, Agent, or Firm—Lloyd M. Forster

[57] ABSTRACT

An anti-backlash rack and pinion drive system comprising a pair of spur gears on parallel shafts engaging a rack with countertorque preload imposed by a positive timing belt engaging a pair of pulleys respectively coupled to the shafts. Slack on one side and a resilient transverse load applied to the other side of the belt provides counterspur gear tooth pressure on the rack equal to the maximum drive load effected through reversible rotation of one of the shafts.

9 Claims, 2 Drawing Sheets

ANTI-BACKLASH DRIVE SYSTEM

BACKGROUND OF THE INVENTION

In manufacturing operations, accurate positioning of carriers or slides with mechanical processing units to predetermined locations along a fixed linear path is frequently accomplished with rack and pinion gearing. If a single pinion drive is employed, backlash between gear teeth may involve unacceptable error in positioning, particularly where accuracy upon reversal of drive is required.

State of the art anti-backlash operation has been provided with a pair of pinion gears mounted on parallel shafts engaging a common rack with an adjustable rigid dual worm gear drive coupling for the pinion gears adapted to produce preload engagement of opposing gear teeth faces with the rack teeth. The rigid coupling has involved need for repeated readjustment to compensate for wear, as well as variation in preload tooth pressure and possible backlash due to inherent tolerance variations in pitch spacing, rack mounting high and low points or other causes of inaccuracies; also, the worm gearing involves low efficiency particularly objectionable in meeting high load acceleration requirements.

A backlash eliminator is disclosed in U.S. Pat. No. 3,151,494, wherein a pair of pinion gears mounted on parallel shafts engage a common bull gear for a rotary table of a machine tool. A pair of pulleys on the respective gear shafts are coupled by a positive drive belt adapted to produce engagement of opposing gear teeth faces with the bull gear teeth through application of tensioning to one side of the belt. Tensioning of the belt causes it to apply preload torque in opposite directions to each of the pulleys and associated pinion gears in order to eliminate backlash. Once such belt tensioning is applied by rigid bell crank leverage, the tensioner is locked in fixed position with no provision for accommodating tolerance variations in the relative operating dimensions.

A further dual pinion anti-backlash carriage drive for a machine tool is disclosed in U.S. Pat. No. 4,714,388. A carriage or slide of a machine tool is moved along a supporting guideway or way by a pair of driven pinions engaging a rack, and each pinion is mounted on the output shaft of a corresponding planetary gearbox. The input shafts of the gearboxes are driven by a reversible electric motor through an endless belt and pulley system. A pair of belt tension wheels engage the endless belt and are supported by a set of spring biased slide members which cooperate to establish a predetermined tension in the belt and a predetermined preload torque on the input and output shafts of the gearboxes to produce a corresponding anti-backlash force of the pinions against the rack.

BRIEF DESCRIPTION OF THE PRESENT INVENTION

The anit-backlash rack and pinion drive system of the present invention comprises a positive timing belt engaging two timing belt sprockets directly coupled to a pair of pinion spur gears which drivingly engage the gear rack. The sprockets and pinions share common parallel shafts with center distance maintained by a rigid housing. The timing belt length is slightly greater than sprocket circumference plus twice the center distance in order to allow for a slack condition on one side and belt tensioning applied to the other by a resilient transverse center loading creating a deflection in the order of 5° from a straight line connecting the sprockets.

A countertorque preload is applied to the pinion gears equal to the maximum drive torque required to accelerate and translate the tool carriage or slide. Drive power from a reversible motor is applied through suitable reduction gearing to a single sprocket/pinion gear shaft which directly applies drive in one direction through the associated pinion gear with a tooth load equal to preload plus driving force while the other pinion gear maintains its preload tooth engagement force without backlash. Upon drive reversal, a tooth load on the directly driven gear is reduced by the amount of the drive force while belt tension imparts continuing preload torque which includes the required driving force on the belt driven spur gear. The resilient belt loading on one side, with slack on the other, maintains substantially constant preload of the respective pinion spur gear teeth on the rack teeth to accommodate wear, tolerance or other irregularities in the exact spacing of tooth contact at the respective pinion gear engagement points.

Accordingly, any accurately located position can be reached in either direction by appropriate encoder controls applied to one of the gears with assurance of exact repeatability. Programmed recording of the required encoding position, corresponding to any required accurate linear positions, can be set with compensating adjustment utilizing supplemental measuring devices to establish the required position within substantially any degree of required accuracy.

DETAILED DESCRIPTION OF PREFERRED EMBODIMENT

Figure 1:
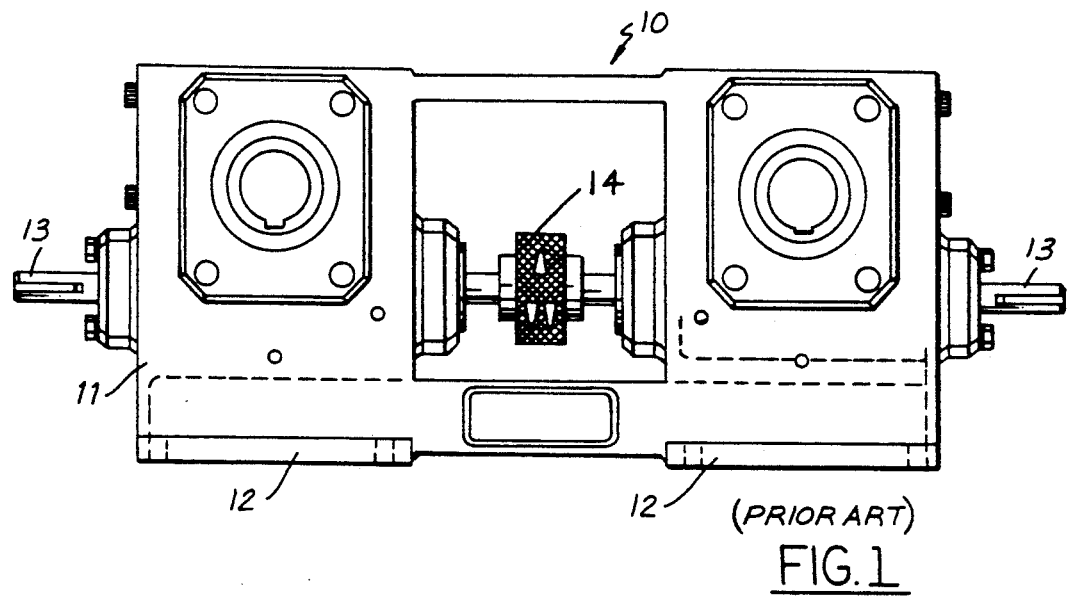
FIG. 1 is a side elevation of a prior art drive head for a pair of gears engageable with a rack.
Figure 2:
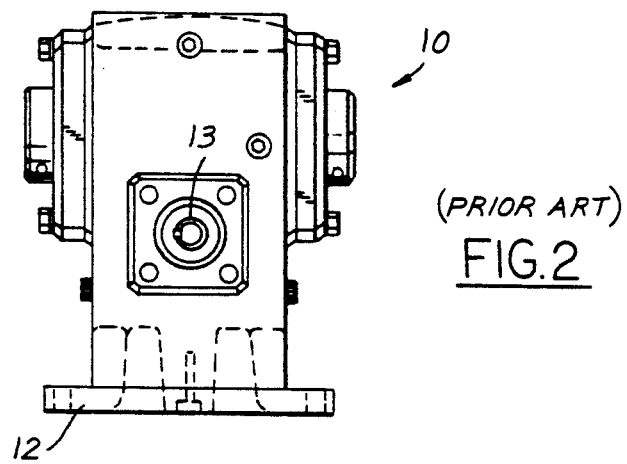
FIG. 2 is an end view of the drive unit illustrated in FIG. 1.

With reference to FIGS. 1 and 2, the prior art anti-backlash rack and pinion drive system known to applicants comprises drive head assembly 10 having rigid housing 11 with base plates 12 adapted for mounting on a wheeled tool carrier or slide for translation on a machine bed having a fixed horizontal rack secured thereto. Either end of input shaft 13 drives a pair of aligned worm gears phased relative to each other through compliance coupling 14 for driving a pair of spur gears adapted to engage a rack on a machine bed with zero backlash through adjustment of the compliance coupling. The rigid system results in inherent variations in tooth pressure, from overloading to possible backlash, rendering it difficult if not impossible to secure precise positioning of the housing 11 when used for mounting on a tool carriage or otherwise relative to the rack; and particularly due to inherent wear in the worm gearing, repeated readjustment of the compliance coupling to take-up the backlash with appropriate preload was found to be required.

Figure 3:
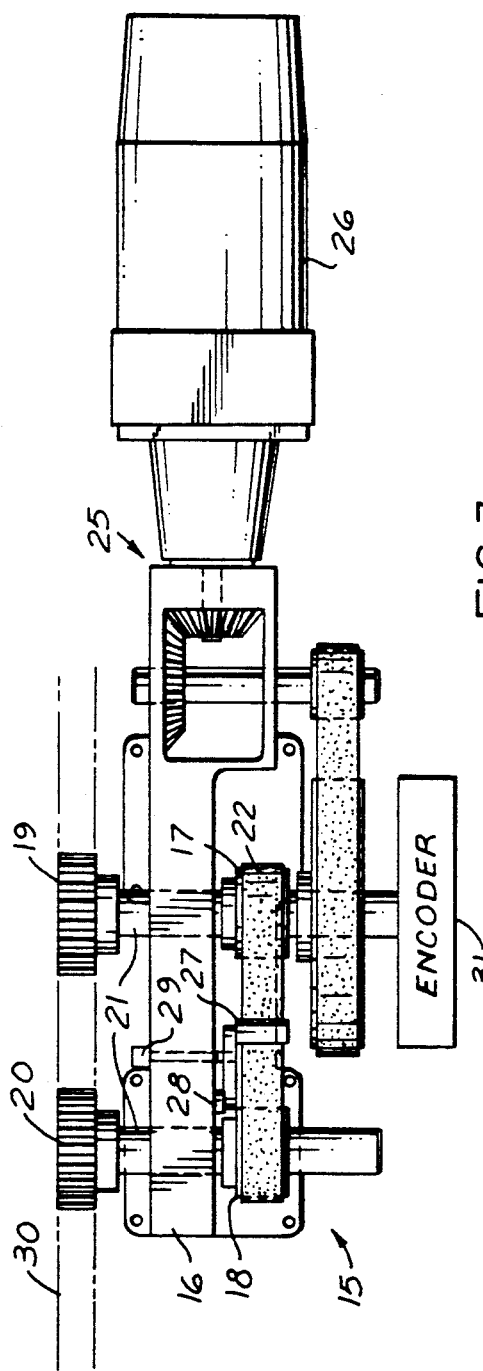
FIG. 3 is a schematic plan view of a dual pinion drive head for engaging a rack in accordance with the present invention.
Figure 4:
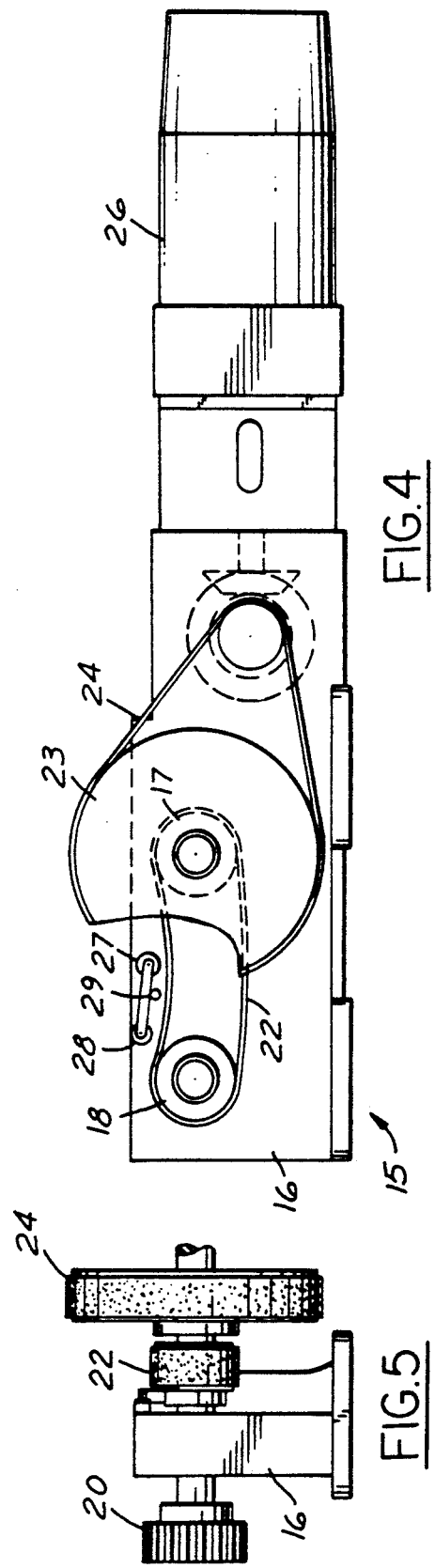
FIG. 4 is a side elevation of the drive unit illustrated in FIG. 3.
Figure 5:
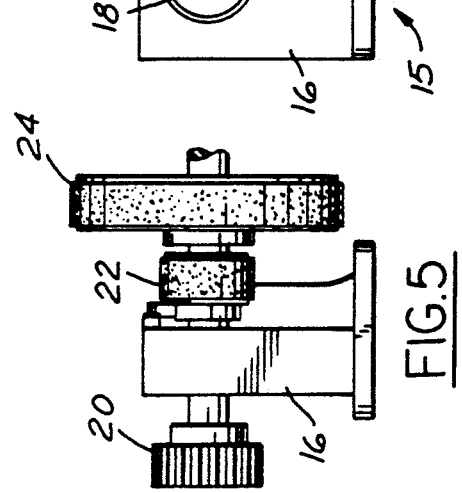
FIG. 5 is an end view of the drive unit illustrated in FIG. 4.

With reference to FIGS. 3-5, drive assembly 10 of the prior art has been replaced by drive assembly 15 comprising rigid housing 16 for mounting a pair of sprockets 17, 18 and associated spur drive pinion gears 19 and 20, each respectively sharing a common shaft 21. Positive timing belt 22 connecting sprockets 17, 18 is driven by sprocket 17, in turn driven through one of shafts 21 by sprocket 23 through belt 24 and bevel reduction gearing 25 by electric motor 26. Resilient belt tensioner 27, preloaded by a torque spring at bell crank pivot 28 against retractable pin 29, is released after belt assembly to apply a transverse resilient preload tension on one side of the belt while slack remains on the other.

Figure 6:
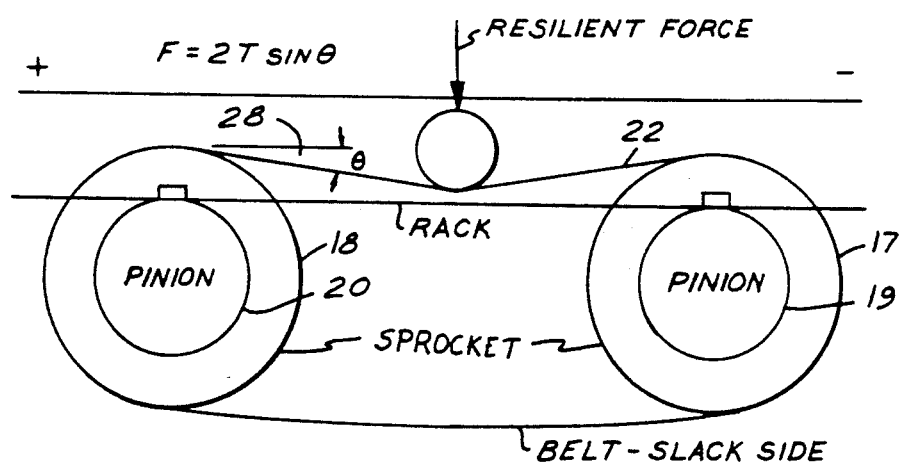
FIG. 6 is a schematic view illustrating the principal of the anti-backlash rack and pinion drive system of the present invention.

With reference to FIG. 6, schematically illustrating the drive system of FIGS. 3-5, belt 22 is shown with slack underside and resilient force applied to the upper side creating tension T and countertorque on sprockets 17 and 18 preloading pinions 19 and 20 with opposing tooth engagement on a machine bed mounted rack such as 30 shown in phantom in FIG. 3. Belt length is sufficient to ensure slack in the underside with maximum drive torque imposed on respective pinions 17 and 18 while the upper side of belt 22 is deflected to an appropriate angle 28, e.g., 5° with full preload force applied.

By applying an appropriate electronic encoder 31 to input shaft 21, exact positioning of the drive assembly, relative to fixed rack 30 may be established and for any specific locations requiring extreme accuracy of positioning. The encoder relation to such positions may be determined by precise set-up observation and programming adjustment, so that repeatability can be assured for the particular pinion rack engagement at such location.

We claim:

1. Drive system for accurately positioning carrier drive means along a fixed linear path on a machine bed having a fixed linear rack comprising reversible rack and pinion gearing with drive means for anti-backlash operation, said system including a rigid carrier reciprocable on said machine bed, a pair of rack engaging pinion gears on parallel gear shafts mounted on said carrier having fixed spacing, a sprocket drive connection with each gear shaft, a positive sprocket coupling timing belt, said belt having a positive engagement with both sprockets to provide a driving belt side and a slack belt side, resilient means for imposing tensioning load on said driving side only of said belt with slack always maintained on said slack side to provide opposite rotational torque on said pair of gears during rack drive engagement, said torque being sufficient to maintain opposing gear/rack tooth engagement without backlash throughout translation of said carrier in either direction along said linear path.

2. System of claim 1 wherein said resilient means is applied transversely at a center portion of one belt side in order to accommodate wear or tolerance variation in the operation of said gearing without significant variation in gear tooth loading.

3. System of claim 2 including motor input drive means to one of said pair of parallel gear shafts for direct associated gear drive of said carrier means in one direction, and belt coupling reverse drive of said carrier drive means by the gear on said other shaft.

4. System of claim 3 including motor input belt drive means to said one of said shafts.

5. System of claim 2 wherein the belt has a length sufficient to provide approximately 5° transverse deflection from said tensioning load.

6. System of claim 5 wherein said pair of gears includes a driving gear (19) powered through motor drive reduction gearing and an idler gear (20) with the direction of drive controlled by said driving gear.

7. System of claim 6 wherein accurate location of said carrier drive means is subject to encoder (31) response to an angular position of one of said gears (19).

8. System of claim 7 wherein said encoder includes means programmed to electronically record the encoded position for each required accurate location.

9. System of claim 8 wherein the encoded position for each required accurate location includes means subject to compensation adjustment of programmed encoder position initially established by independent gaging with repeatability thereby ensured.

* * * * *